US012747618B2

(12) United States Patent
Goli

(10) Patent No.: US 12,747,618 B2
(45) Date of Patent: Sep. 29, 2026

(54) DOOR HINGE WITH WIRE HARNESS

(71) Applicant: Ghonche Goli, Reseda, CA (US)

(72) Inventor: Ghonche Goli, Reseda, CA (US)

( * ) Notice: Subject to any disclaimer, the term of this patent is extended or adjusted under 35 U.S.C. 154(b) by 162 days.

(21) Appl. No.: 18/658,370

(22) Filed: May 8, 2024

(65) Prior Publication Data

US 2024/0309687 A1 Sep. 19, 2024

Related U.S. Application Data

(60) Provisional application No. 63/451,724, filed on Mar. 13, 2023.

(51) Int. Cl.
*E05D 11/00* (2006.01)
*H01B 7/00* (2006.01)

(52) U.S. Cl.
CPC ....... *E05D 11/0081* (2013.01); *H01B 7/0045* (2013.01)

(58) Field of Classification Search
CPC ... E05D 11/0081; E05D 11/00; H01B 7/0045; H01B 7/00
USPC ........................................................ 174/72 A
See application file for complete search history.

(56) References Cited

U.S. PATENT DOCUMENTS 4,412,711 A * 11/1983 Suska .................... H01R 35/02 439/31
8,517,747 B2 * 8/2013 Bryla .................. E05D 11/0081 439/165
2005/0091797 A1 * 5/2005 Dillingham ............. E05D 3/122 16/354
2011/0116198 A1 * 5/2011 Kramer ............... H01F 27/2871 505/150
2017/0264090 A1 * 9/2017 Shah .................... H02G 3/0481

OTHER PUBLICATIONS

Concealed Electric Through Wire Hinge_ Hager_pages 1-13_Mar 2019.*
Power Transfer Solutions_Mckinney_pages 1-12_2009.*

* cited by examiner

*Primary Examiner* — Timothy J Thompson
*Assistant Examiner* — Guillermo J Egoavil
(74) *Attorney, Agent, or Firm* — Patent 360; Barry Choobin

(57) ABSTRACT

A door hinge apparatus for provisioning power and data connectivity to electronic devices in a door and outdoors. The door hinge apparatus includes a wire harness in the form of an electrical ribbon. The wire harness includes multiple power lines and data lines, including 24V and 120 V power lines, and data lines. The apparatus includes a door hinge in which a base plate of the hinge includes one or more channels for accommodating the wire harness permitting it to pass through from the interior to the exterior of a building. Interior and exterior connectors provide one-click connectivity to power sources, network sources, and electronic devices. The apparatus may also include a barrel for coupling with the hinge, wherein the barrel allows the passing of the wire harness from a connector to a terminal box in a door.

11 Claims, 11 Drawing Sheets

DOOR HINGE WITH WIRE HARNESS

CROSS-REFERENCE TO RELATED APPLICATIONS

This application claims priority from a U.S. Provisional Patent Appl. Ser. No. 63/451,724, filed on Mar. 13, 2023, which is incorporated herein by reference in its entirety.

FIELD OF INVENTION

The present invention relates to a door hinge with a wire harness, and more particularly, the present invention relates to a door hinge with a wire harness for power and data transfer "to and through" a door.

BACKGROUND

In the majority of households and commercial buildings, the power supply and data connectivity are primarily provisioned indoors with very few outdoor options. For example, there are over 250 million residential homes, apartments, commercial buildings, and businesses in the U.S. alone, and most of them lack any suitable provision for outdoor power supply and data connectivity. This forces manufacturers to produce high-maintenance and negative carbon footprint battery-operated exterior electronic devices due to a lack of available hardwired power. Also, a need often arises for an outdoor power supply and/or data connectivity. There is a wide array of electronic and electrical devices for outdoor use. For example, electronic devices, such as smart door locks, video doorbells, security cameras, landscape lighting, Christmas lights, water fountains, supplemental lighting, security boxes, and the like require a hardwire power supply and may also require data connectivity.

Retrofitting wire harnesses for outdoor use is labor intensive and requires significant modifications in the walls of a building. Besides being labor intensive, the process can be cumbersome for the residents. Moreover, certain rental and leased properties may not allow such modifications, depriving the tenant of the ability to enjoy the benefits of many existing and new electronic devices and features to improve their lifestyle, safety, security, e-commerce efficiency, and property beautification. Whether it is the fight against porch pirates (over 240 million packages were stolen in 2022), improving e-commerce delivery accuracy, verification, and times, or installing and powering any of the other noted devices, people need to enjoy a fast and simple way to deliver electrical power and connectivity where they want it.

Thus, a need is appreciated for a door hinge with a wire harness that allows for power supply and data connectivity outdoors.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a door hinge apparatus with a wire harness for power supply and data connectivity.

Another object of the present invention is that the door hinge apparatus can be retrofitted or utilized by OEM door manufacturers.

Still another object of the present invention is that the door hinge apparatus is economical to manufacture.

Yet another object of the present invention is that any modification in the building for installing wire harnesses outdoors can be avoided.

A further object of the present invention is that the cost of fitment can be significantly reduced.

In one aspect, disclosed is a door hinge apparatus for supplying power and data connectivity from interiors to electronic devices located outdoors. The door hinge apparatus can be used to hingedly mount a door to a door frame. The door hinge apparatus comprises a wire harness in the form of a ribbon that includes multiple power supply option including 220 V, 110, 24 V power lines and suitable data lines. The door hinge apparatus comprises a base plate that has one or more channels, wherein the depth of each of the one or more channels is at least to accommodate the wire harness.

In one aspect, the one or more channels comprises two channels running parallel and spaced apart from each other. The depth of the channels can be about one-eighth inches for a wire ribbon of a thickness of about one-sixteenth inches.

In one aspect, the apparatus further comprises a wall mountable connector for connecting the wire ribbon to extension cords, the extension cords can be for the power source and data source.

In one aspect, the apparatus may further include an exterior connector utilized for connecting one or more loads i.e., outdoor electrical devices. Each of the interior connector and the exterior connector has multiple terminals for connecting the multiple power lines and data lines.

BRIEF DESCRIPTION OF DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Figure 1:
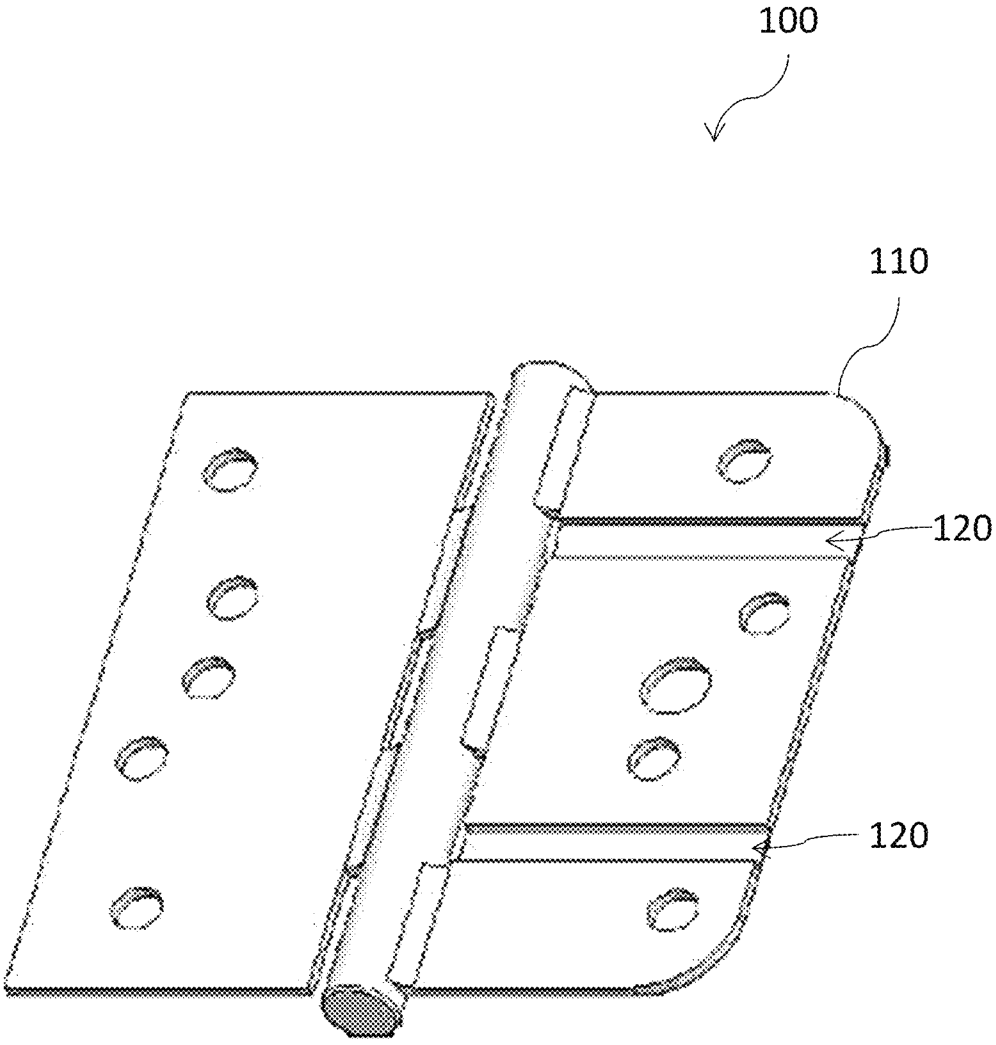
FIG. 1 is a perspective view of a door hinge apparatus, according to an exemplary embodiment of the present invention.

Subject matter will now be described more fully hereinafter with reference to the accompanying drawings, which form a part hereof, and which show, by way of illustration, specific exemplary embodiments. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is to describe particular embodiments only and is not intended to be limiting to embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. The following detailed description includes the best currently contemplated mode or modes of carrying out exemplary embodiments of the invention. The description is not to be taken in a limiting sense but is made merely to illustrate the general principles of the invention since the scope of the invention will be best defined by the allowed claims of any resulting patent.

The described invention pertains to a door hinge apparatus that allows for supplying outdoor power supply and data connectivity from indoors through wire harnesses without needing any permanent property modifications, expensive electricians, or skilled craftsmen. The disclosed door hinge apparatus helps to supply power and data connectivity outdoors quickly and easily for immediate benefits. The disclosed door hinge apparatus can be retrofitted in a wide array of needed scenarios or as an OEM (original equipment manufacturer) product included with an entry, sliding glass, or garage doors, making these products widely available. The described invention can support the significant need in the quest for safety, security, convenience, and efficiency.

The wire harness may also include network cables, such as Ethernet cables for network connectivity. The wire harness can be in the form of an electrical ribbon that can be protectively encased/shielded. The encasing material can be insulating, flexible, and durable, and may possess any further desired characteristics. The disclosed wire harness may include an input interface for connecting to the power supply and network connections. The wire harness may also include output interface for connecting the electronic and electrical interfaces. The interfaces can be one-click secure connection connectors for quick and easy connections. The connectors can be a part of male and female sockets wherein another part of the sockets can be attached to the subject entry, sliding glass, or garage door(s). The exterior power source can be of the same design and connect in the same fashion on the external side of the apparatus. The advantage of such connectors is the ease of use and prevention of any risk of incorrect wiring. As described, the multifunction wiring schematic with disclosed plugs and connectors eliminates the need for "bare wire connectivity" and also cross-wiring to the wrong wires and causing a short or electric shock.

In certain implementations, the different voltages, such as 24 V can be processed through an in-line transformer on the interior side of the connector. The electrically engineered ribbon may include integrated 220 V, 110 V, 24 V, and electronic data wires (conforming to standards for security cameras and video doorbells), which are encased in insulated plastic to eliminate the potential for electrical shock and data interference while maintaining a nominal one-sixteenth inches thickness. The ribbon width can be determined in the engineering process to carry and transfer the electrical transmission. A 220 V version can be provided for commercial applications which may also include the same 110 V, 24 V, and data feed cable method as described above.

In certain implementations, the disclosed apparatus can include identical connectivity connectors that feature one-click connection with a tamper-proof design. The design allows for interior and exterior connector assemblies. Also, the interior and exterior extension cords of suitable lengths (with unique connectors), can be provided with proper amperage allowing for it to be extended via the extension cords to effectively reach the desired component location.

In certain implementations, the disclosed are a multi-plug receiver and supply wire harness along with extension cords with unique male and female connector plugs (in standard 12", 24", 36", and 6' lengths) are disclosed to eliminate incorrect power source and supply attachments by making the connectors in such a way they are not interchangeable with typical extension cords (while the power source plug is the standard 3-prong with the ground), providing the desired power and connectivity source the consumer is seeking. Fast and simple integration of product solutions at scale is the predominant way to bring new innovations to the masses that are seamless and affordable.

The disclosed door hinge apparatus includes a door hinge that can be installed on a door. The door hinges can be provided for different kinds of doors. For example, a door hinge like standard door hinges can be provided for retro fitment replacing the conventional door hinge with the disclosed door hinge. It is obvious that the disclosed hinge can be installed in the door at the time of manufacturing the doors or installing the doors. Thus, the disclosed door hinge can be adapted for both new installations and retrofitting. The disclosed door hinge permits passing the disclosed wire harness from indoors to outdoors without needing any significant modification to wall or the door frame. The disclosed apparatus provides the ability to simply plug-in the desired 220 V, 110 V, 24 V, and/or data cable into an outlet or power source in the interior of a property and by connecting the corresponding power supply on the adjacent exterior, provide immediate power and data transfer to a wide variety of electronic devices as disclosed.

Figure 2:
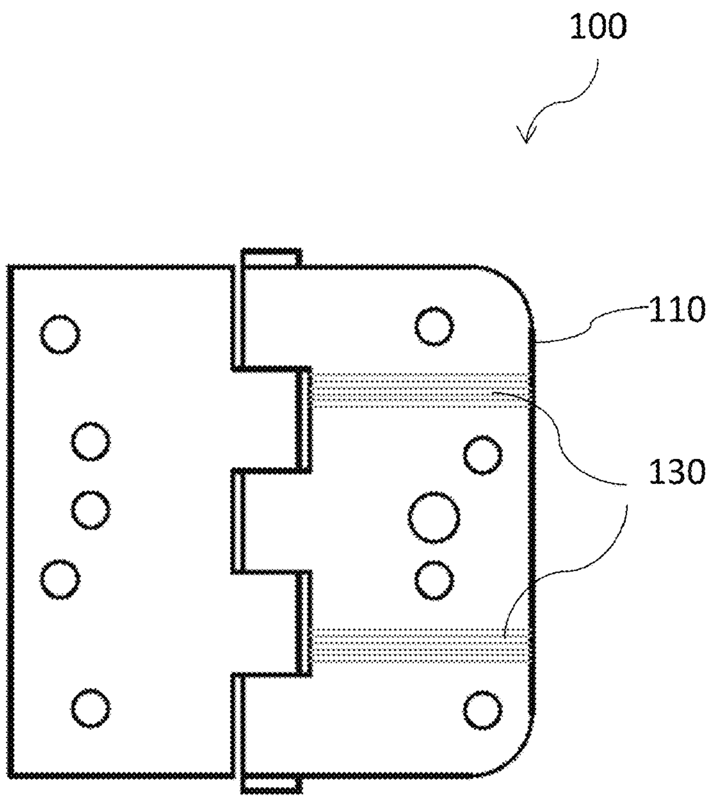
FIG. 2 is a schematic front view of the door hinge apparatus, also showing the wire harness, according to an exemplary embodiment of the present invention.
Figure 3:
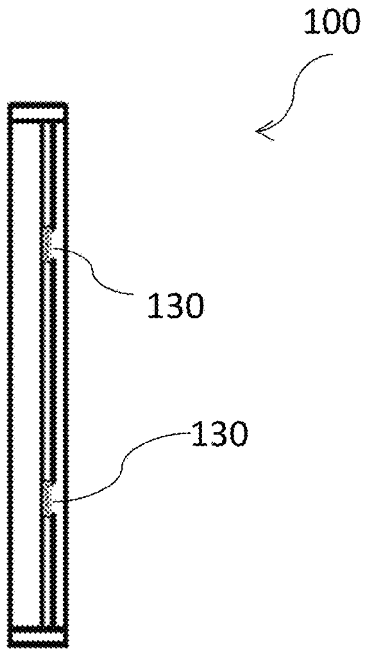
FIG. 3 is a schematic side view of the door hinge apparatus showing the wire harness, according to an exemplary embodiment of the present invention.

Referring to FIGS. 1-3, FIG. 1 illustrates a perspective view of a door hinge apparatus 100, FIG. 2 illustrates a schematic front view thereof, and FIG. 3 shows a side view thereof. The door hinge apparatus 100 includes a pair of base plate 110 hingedly coupled together through a door pin. The door hinge apparatus 100 can be mounted to a door frame, similar to a conventional door hinge. The base plates have multiple holes for the screws to pass through. The size of the base plates may vary depending on the different types of doors. FIG. 1 shows baseplate 110 that includes two channels 120 for the wire harness. This plate juxtaposes with the door frame, wherein the channel provides path of the wire harness to pass through. The two channels run transversely and parallel to each other, spaced apart by some distance. The depth of the channels can correspond to the thickness of the wiring ribbon. For example, the channel can be about one-eighth inch deep. The insulated wire harness ribbon can be about one-sixteenth inch thick. Thus, any old door hinge can be replaced by the disclosed door hinge and the wires can be made to pass through safely and without any modification to the structure. The wire ribbon is further protected by the base plate. It is to be noted that the number of channels may vary, for example, one or more channels in the base plate are within the scope of the present invention.

To the indoor side of the door hinge, a wire harness socket can be provided that can connect to the power supply and data network through a suitable connector. It is understood that the interfaces can be male and female plugs/sockets. A similar interface can be provided on the outside for connecting the external electronic devices. FIGS. 2 and 3 show a wire harness 130 running along the two channels 120.

The wire harness, also referred to herein as a wire ribbon, can be in the form of an electrical ribbon proceeds from the interior side of the wall adjacent to the door, passes through channels of the as shown and proceeds to the exterior side of the door frame and makes a 90° angle across the exterior door trim to the exterior face of the property to be connected by a power plug.

The disclosed door hinge can be made of suitable materials, such as aluminum, iron, alloys of iron, steel, and the like. The disclosed door hinge includes a coordinating channel approximately one-eighth inches deep that permits the required thickness of the electrical wiring ribbon as designed to facilitate the seamless transfer of electrical and data transmission power per the 220 V, 110 V 24 V, and data cables specifications.

The disclosed door hinge can be of specific advantage by provisioning electrical and data transfer mechanisms that provide fast, safe, and secure power to the outdoors of all types of residential and commercial properties for all types of devices and uses. The disclosed door hinge apparatus provides for the safe transfer of 220 V, 110 V, 24 V, and like any desired voltage wire harness. Also, for data connectivity, CAT 5 (or coaxial) cabling can be incorporated, or any suitable wire harness for the data connectivity.

The disclosed door hinge apparatus is particularly useful for buildings that lack any outdoor power supply and data connectivity. The disclosed door hinge apparatus can be adapted for most types of commercial and residential doors including a garage door. Also, the disclosed apparatus can be advantageous in that it can be installed quickly and easily by a person of ordinary skills in art without any specialized knowledge or skills. Moreover, any risks of shock and electrocution can be avoided while installing the apparatus can be prevented.

Figure 4:
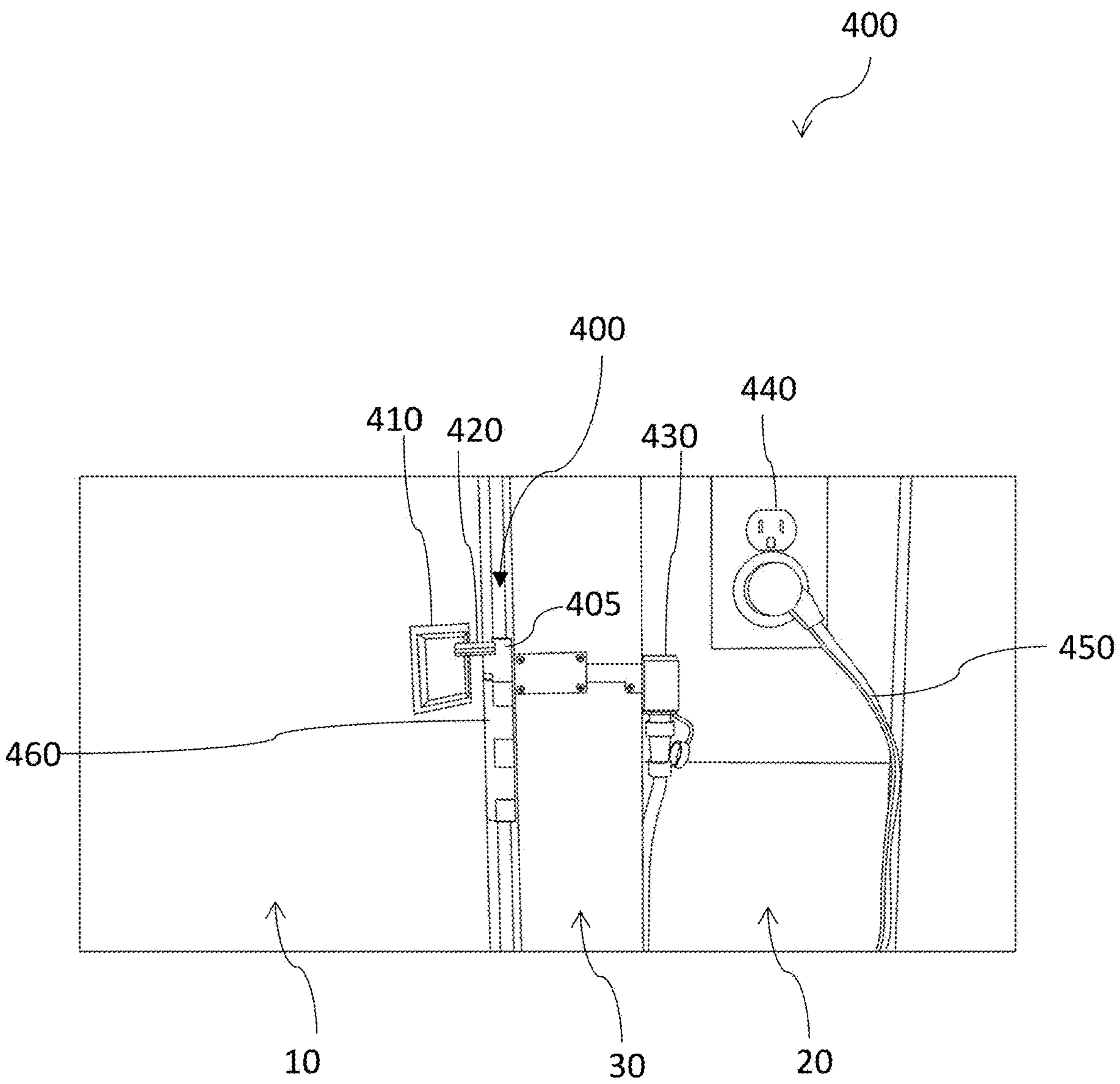
FIG. 4 illustrates the apparatus for a door frame, according to an exemplary embodiment of the present invention.

Referring to FIG. 4 which illustrates another embodiment of the apparatus that can be utilized for supplying power to a door. Many electronic device are available for mounting a door, specifically the door at entrance of a building. Examples of such device include doorbell, video camera, and man other. Such a device requires both power supply and data connectivity. The disclosed apparatus 400 can neatly and quickly provide power and data connectivity to the door through hard wires.

The apparatus 400 may include a barrel 405 that provides for meticulously organizing of wires harness entering the door. The barrel typically can be a part of the door hinge or can be mounted to the door hinge. As shown in the drawings, the barrel is mounted to the top of the door hinge 460 through the door pin. Also, it is to be noted that the door hinge can be any conventional door hinge or the door hinge apparatus 100 as shown in FIG. 1. This door hinge apparatus combination may allow wire harness supply to both the door and outdoors.

Figure 5A:
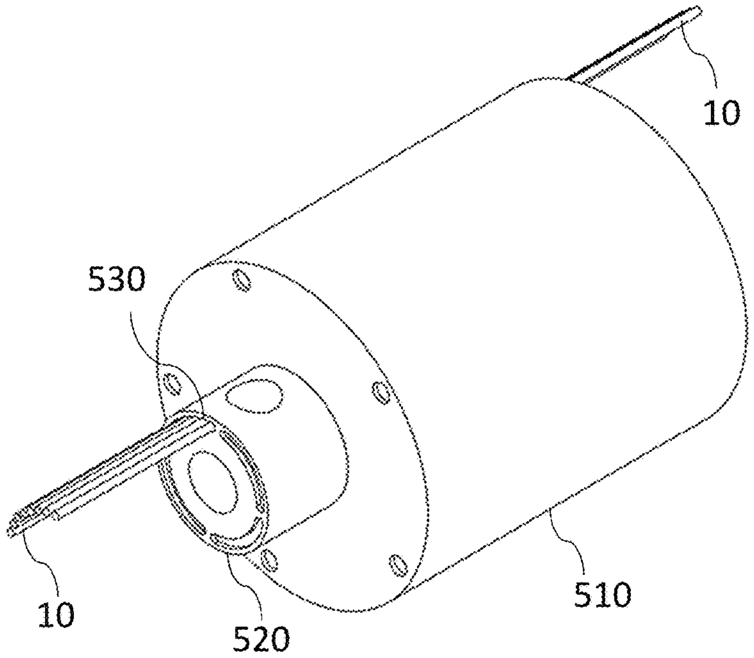
FIG. 5A is a perspective view of a barrel of the apparatus for door pin, according to an exemplary embodiment of the present invention.
Figure 5B:
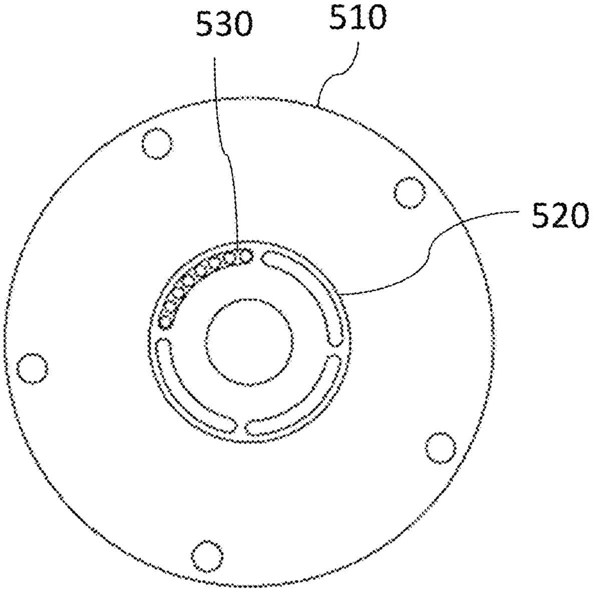
FIG. 5B shows a top view of the barrel, according to an exemplary embodiment of the present invention.
Figure 5C:
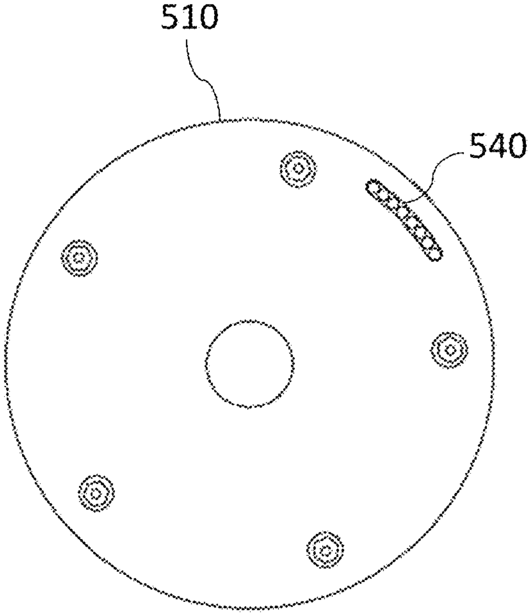
FIG. 5C shows a bottom view of the barrel, according to an exemplary embodiment of the present invention.
Figure 5D:
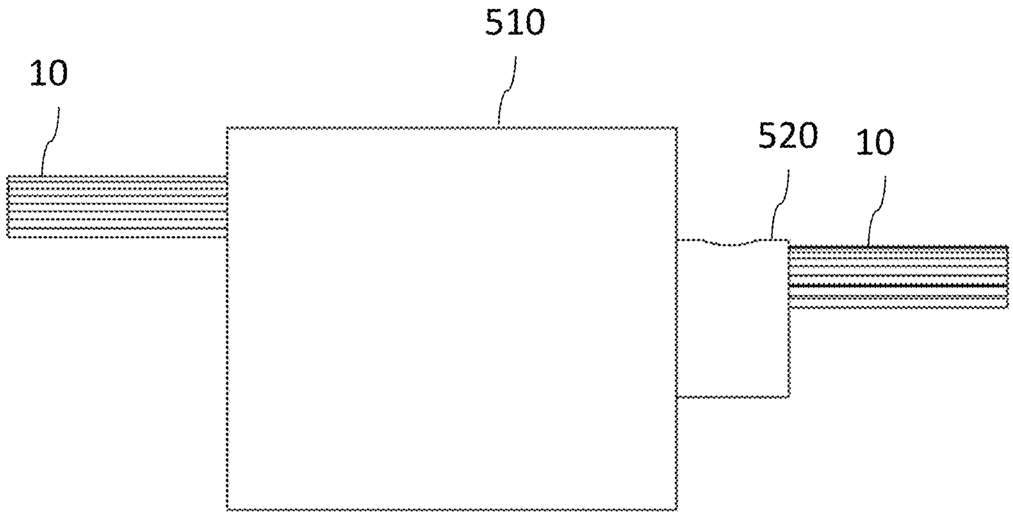
FIG. 5D shows a side view of the barrel, according to an exemplary embodiment of the present invention.

The structure and functioning of barrel 405 are further illustrated in FIGS. 5A-5D. As shown in FIG. 5A, the barrel includes a stator 510 and a rotor 520. The rotor relative to the stator can rotate with the hinge joint and allows the wire ribbon entering the door to move with the door. The barrel provides a neat and secure pathway to the wire ribbon. As shown in the drawing, the stator has a port 540 for the wire ribbon at its bottom and the rotor has a port 530 for the wire ribbon at its top. Thus, the wire ribbon 10 can enter port 540 and exit from port 530. The rotation of the rotor allows the rotation of the door without bending the wires and allowing a transitional connection whereby the door can open and close without pinching the wires.

Again, referring to FIG. 4, the apparatus further includes a box 410 through which the wires can enter the cavity of the door. The cover of the box keeps the wires secure as well as providing an aesthetic appearance. The box includes various terminals for connecting to the wire ribbon. The wire ribbon 420 is shown in the drawing extending from a wall mounted connector 430, enter a bottom portion of the barrel and exits from a top portion of the barrel and then enters the box 410 in the door 10. Between the connector and the barrel, the wire ribbon can run behind the door trim 30, which keeps the wire ribbon secure and hidden for aesthetic appearance. Similar kind of arrangement can also be provided for the door hinge apparatus 100. Connectors can be provided both indoor and outdoor for connecting to power supply or devices. Extension cord 450 can be used to connect the connector to a power supply socket 440 mounted in wall 20.

The wall-mount connector 430 shown mounted to the wall on the side of the door frame. It is obvious that the position of the connector can be varied without departing from the scope of the present invention. An extension cord 450 can connect between the connector 430 and a power supply socket 440 in the wall 20.

Figure 6:
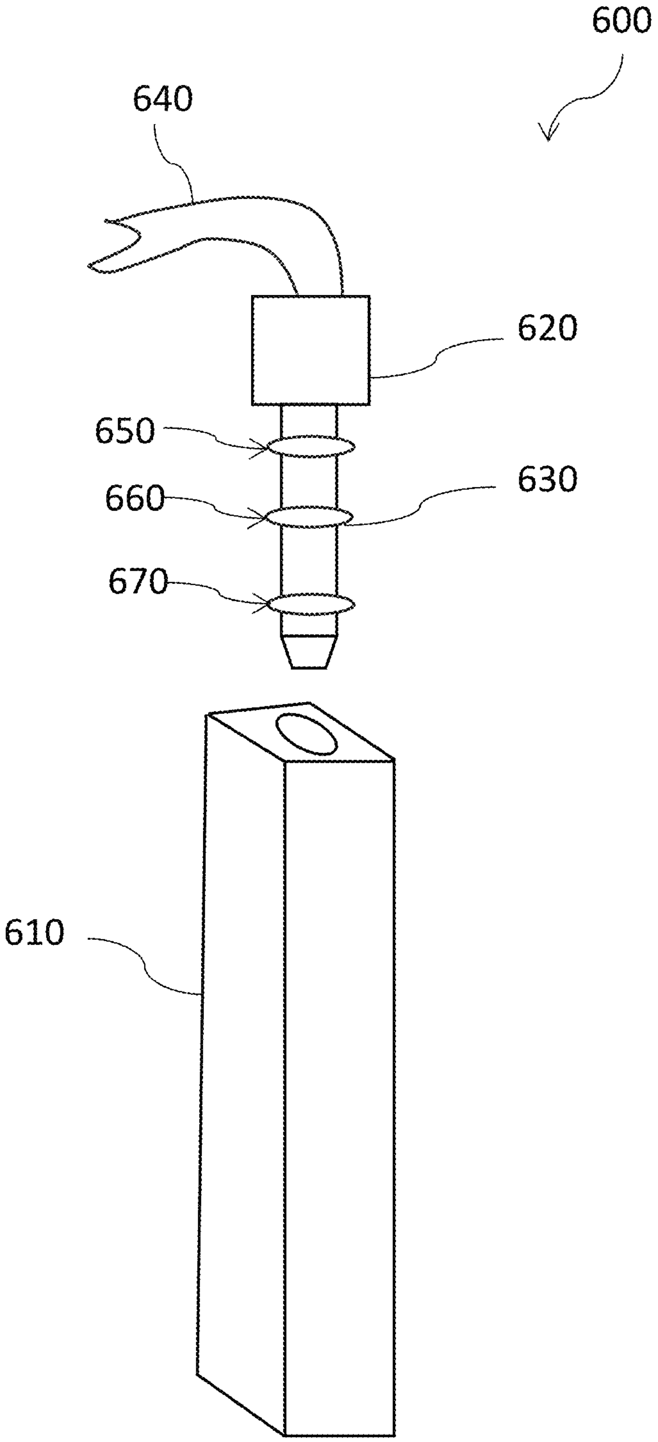
FIG. 6 shows a connector of the apparatus that has male and female sockets, according to an exemplary embodiment of the present invention.
Figure 7:
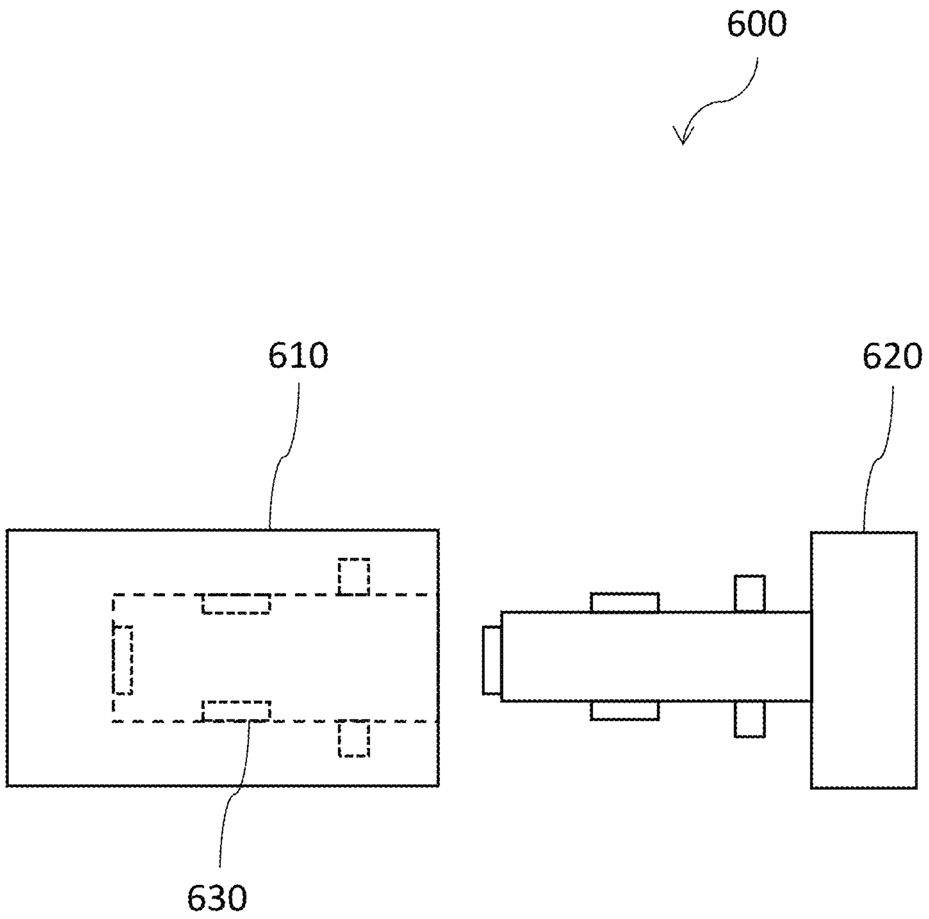
FIG. 7 is a schematic view of the connector showing the terminals, according to an exemplary embodiment of the present invention

FIGS. 6 and 7 show an embodiment of the connector 600. The connector 600 can be mounted to any supporting structure and provides an interface between the power supply and the wire ribbon. In the case of outdoor use, the connector can provide an interface between the wire ribbon and external power socket. The connector provides an advantage of plug and play functionality, avoiding any risk of incorrect wiring and shock.

The connector includes a housing 610 that can be mounted to a supporting structure, such as a wall. The hosing can be made from any insulating and durable material, such as plastic. The housing can also be made waterproof and dustproof, for example when used outdoors. Either the male or female member of the connector can be build into the housing. A plug 620 can fit into the housing and make contacts with the terminals. The connector can include multiple terminals 630 for connecting the different power lines and data lines. The connector can include suitable guides for ensuring correct connection and preventing any wrong connection. The plug includes an extension cord 640, a CAT5/COAX terminal 650, a 24V terminal 660, and a 120V terminal 670.

As described above, the disclosed apparatus permits provisioning both power and data connectivity to outdoors and into the door quite easily and quickly, simply plug and play. No significant electrical connections must be made, nor any significant modifications to the structure are required to be made. The wire harness can support a variety of power supply and networking needs for a range of electric and electronic devices. For example, the wire harness may include power supply interfaces including 24 V, 110 V, and 240 V. The user may not need any adapter but can directly connect different electronic devices directly with the disclosed wire harness.

Figure 8:
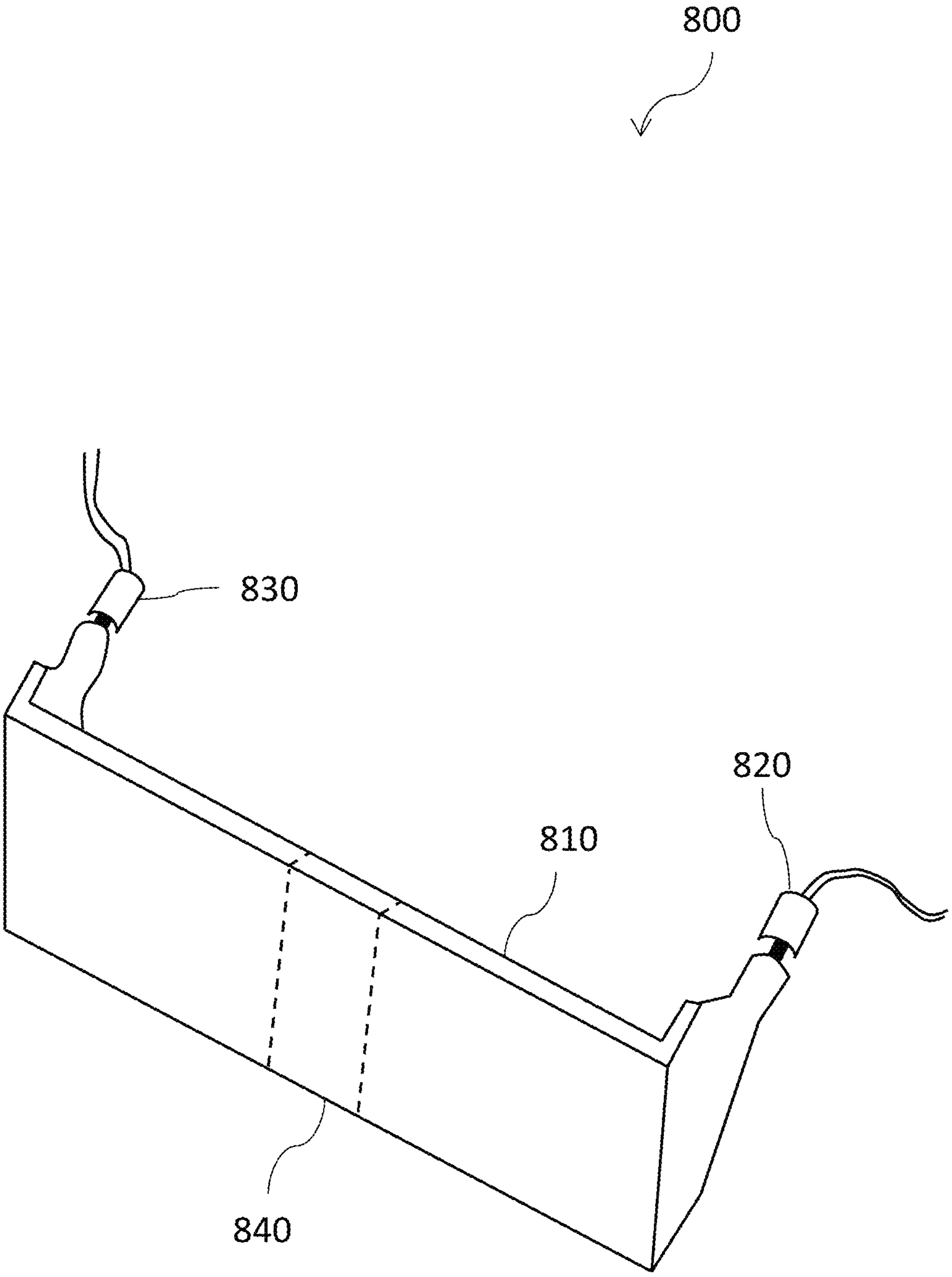
FIG. 8 shows an apparatus for garage doors and sliding doors, according to an exemplary embodiment of the present invention.
Figure 9:
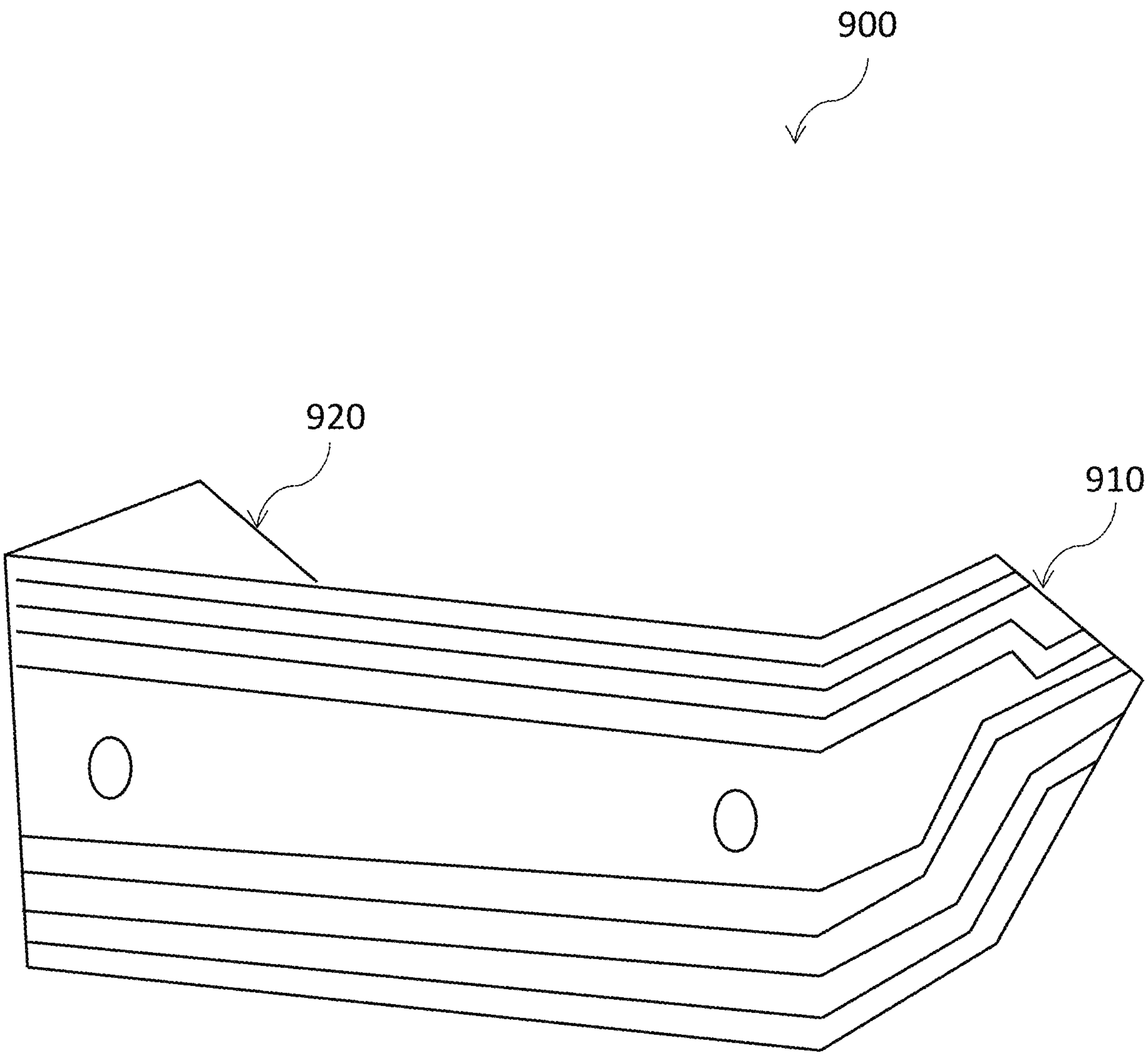
FIG. 9 shows a wire harness for the door hinge, according to an exemplary embodiment of the present invention.
Figure 10:
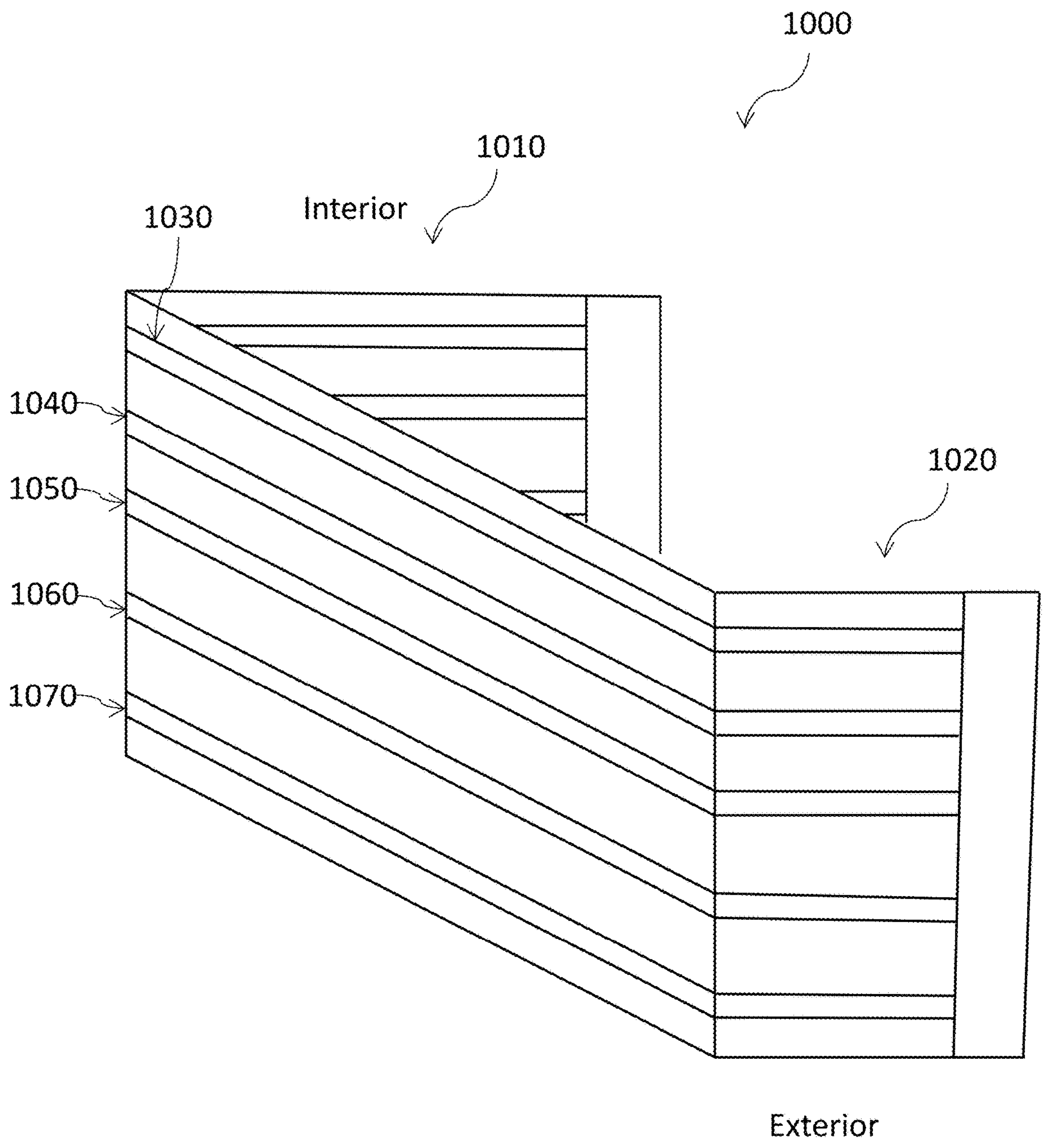
FIG. 10 shows a wire harness for the door hinge, according to an exemplary embodiment of the present invention.

FIGS. 8 to 10 illustrate another embodiment of the apparatus for use with sliding doors. Sliding doors are quite common in entrances, garages, and the like. FIG. 8 shows an exemplary embodiment of the door apparatus 800 adapted for garage doors. The door apparatus 800 includes housing 810 which encases the wire harness. On the left side of the housing is an interior connector 820 for connecting to a power source. On the right side of the housing can be an exterior connector 830 for connecting to load. In the middle of the housing, can be an expandable part 840 that can expand and contract. The expandable part allows for expansion with movement of the door.

FIG. 9 shows a wire harness layout 900 wherein the wires on the right side 910 can be connected to an interior connector and the wires on the left side 920 can connect to an exterior connector.

FIG. 10 shows an embodiment of the wire harness 1000 which on interior side 1010 can be about three and three-fourth inches, and on the exterior side 1020 can be about one and three-fourth inches. The wire harness can include a CAT 5/COAX line 1030, 24V line 1040, 120 V line 1050, 24 V line 1060, and CAT 5/COAX line 1070.

Figure 11:
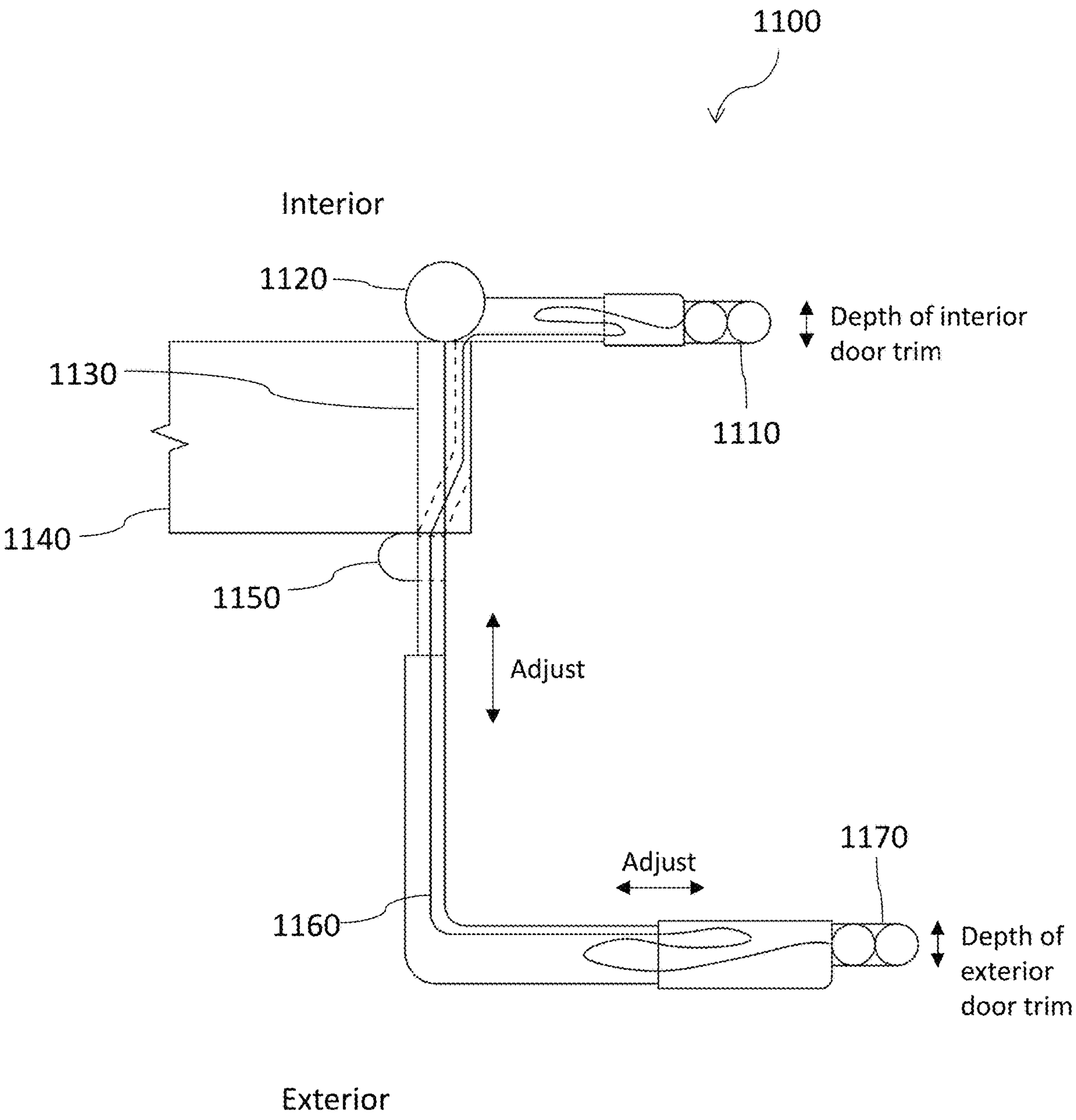
FIG. 11 is a schematic diagram illustrating the operation of the apparatus in a sliding door, according to an exemplary embodiment of the present invention.

Referring to FIG. 11 which shows an exemplary embodiment of the apparatus 1100 for sliding doors. The apparatus includes a duplex connector power source 1110, a door pin 1120, a hinge 1130, electric ribbon 1160, and duplex connector power supply 1170. FIG. 11 also shows door 1140, wherein the hinge is coupled to the door and a door frame. FIG. 11 also shows an exterior door trim 1150. As shown in FIG. 11 the wire ribbon can extend and retract with the movement of the door.

In certain implementations, the disclosed door hinge apparatus may include interior and exterior end caps. The interior side cap is designed to allow for a nominal adjustment as door frame widths may vary. The proprietary style one-click secure interior and exterior power source and supply cords (that may also have screw-on retainer caps) are supplied that once plugged into the coordinating interior outlet plug provide immediate power and connectivity.

In certain implementations, the embedded wire harnesses are designed in a novel and proprietary way that coordinates with the power plugs by aligning the circuit wiring with their specifically designed voltage and/or data plug. Each plug and cord can be clearly marked with their designated use, such as 220 V, 110 V, 24 V, and data cable, and as it is plugged in, only connects to its specific wiring. If a 110 V plug and cord are utilized as the interior power source plug and a different plug is utilized on the exterior supply connection (other than a 110 V), it simply will not complete the connection while not creating a short in the wiring, clear and simple instructions will be provided to avoid confusion.

In consideration of this feature, dual ports will be designed for next-generation products to allow for a combination of voltages (such as 110 V and 24 V) to be transferred and connected at once. Single ports, as identified in the present drawings are based on matching a single power source, such as 110 V, with its coordinating power and supply plug/cord, as can be supplied with the product and/or sold separately.

In certain implementations, also disclosed is a door frame with the disclosed door hinge. The door frame can include integrated electronic devices, such as a security camera, video doorbell, package delivery electronic cabinets, and the like. The electronic device through the disclosed door hinge can be connected as plug and play, wherein the hardwired connection can avoid wireless configurations and the use of mobile applications. FIG. 4 shows an implementation of the door frame.

In certain implementations, the disclosed apparatus may include adjustable face and 90° angled corners to accommodate a wide variety of different widths of door frame interior and exterior trims and moldings, allowing for the electrical power transfer to occur with minimal adjustment and without exposing or manipulating the wire harness.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A door hinge apparatus for supplying power from indoors to electronic devices located outdoors, the door hinge apparatus is configured to be mounted to a door, the door hinge apparatus comprises:

a wire harness in a form of a flat electrical ribbon; and a door hinge, wherein the door hinge consists of:

a first base plate, a second base plate, and a door pin, wherein the first base plate is hingedly coupled to the second base plate through the door pin, wherein the first base plate is configured to be mounted to a door frame, and the second base plate is configured to mount to the door;

wherein the first base plate includes one or more channels, each of the one or more channels is in a form of a traverse groove made on an inner surface of the first base plate, the inner surface juxtaposes with the door frame, the traverse groove has a flat base and a narrow depth corresponding to a width and thickness of the wire harness, each channel extends linearly from an outer edge to an inner edge of the first base plate and is open on both sides.

2. The door hinge apparatus according to claim 1, wherein the one or more channels consists of two channels running parallel and spaced apart from each other.

3. The door hinge apparatus according to claim 1, wherein the wire harness comprises separate conductors dedicated for at least 110 V power supply, 24 V power supply, and further comprises at least one data line integrated within the flat electrical ribbon.

4. The door hinge apparatus according to claim 3, wherein the wire harness further comprises a conductor configured for 220 V power supply integrated within the flat electrical ribbon.

5. The door hinge apparatus of claim 1, wherein the door hinge apparatus further comprises:

a barrel configured to couple to the door hinge, the barrel comprises a rotor and a stator, wherein rotor is configured to rotate relative to the stator, wherein the rotor rotates with the door, wherein the rotor has an exit port for a second wire harness and the stator has an entry port for the second wire harness the second wire harness exiting from the rotor does not bend or flex with rotation of the door.

6. The door hinge apparatus of claim 5, wherein the door hinge apparatus further comprises a connector for connecting to a power source and network source, wherein an end of the wire harness is coupled to the connector.

7. The door hinge apparatus of claim 5, wherein the apparatus further comprises a terminal box configured to be mounted into a door, the terminal box configured to receive a leading end of the second wire harness.

8. A door hinge apparatus for supplying power and data connectivity from indoors to electronic devices located outdoors, the door hinge apparatus is configured to be mounted to a door, the door hinge apparatus comprises:

a wire harness in a form of an electrical ribbon, the wire harness comprises a plurality of power lines that supports different voltages, and at least one data line; and a door hinge, wherein the door hinge comprises:

a base plate, the base plate comprises two channels running parallel and spaced apart from each other, the two channels in the base plate run traversely, wherein a depth of each channel corresponds to a thickness of the wire harness, wherein the depth is one-eight inches, and the thickness of the ribbon is one-sixteenth inches.

9. A door apparatus for supplying power to a door, the door apparatus comprises:

a door hinge for coupling a door to a door frame; and a barrel configured to mount to a top of the door hinge, the barrel comprises:

a rotor, and a stator, wherein rotor is configured to rotate relative to the stator and with the door hinge, wherein the rotor has an exit port for a wire harness and the stator has an entry port for the wire harness, wherein the rotor rotates with the door and the wire harness exiting from the rotor does not flex or bend with door rotation.

10. The door apparatus of claim 9, wherein door apparatus further comprises the wire harness in a form of an electrical ribbon, the wire harness comprises a plurality of power lines that support different voltages, and further comprises at least one data line.

11. The door apparatus of claim 10, wherein the door apparatus further comprises a terminal box configured to be mounted into the door, the terminal box configured to receive a leading end of the wire harness.

* * * * *